US011158131B1

(12) United States Patent
Buzzerio et al.

(10) Patent No.: US 11,158,131 B1
(45) Date of Patent: Oct. 26, 2021

(54) SYSTEM AND METHOD FOR GENERATING AUGMENTED REALITY OBJECTS

(71) Applicant: HORIZON GROUP USA, INC, Warren, NJ (US)

(72) Inventors: Evan Buzzerio, Warren, NJ (US); Hiu Lee, Hackettstown, NJ (US)

(73) Assignee: Horizon Group USA, Inc., Warren, NJ (US)

( * ) Notice: Subject to any disclaimer, the term of this patent is extended or adjusted under 35 U.S.C. 154(b) by 0 days.

(21) Appl. No.: 17/242,491

(22) Filed: Apr. 28, 2021

Related U.S. Application Data

(63) Continuation of application No. 17/102,721, filed on Nov. 24, 2020, now Pat. No. 11,017,609.

(51) Int. Cl.
*G06T 19/00* (2011.01)
*H04L 29/08* (2006.01)
*G06T 19/20* (2011.01)

(52) U.S. Cl.
CPC ............ *G06T 19/006* (2013.01); *G06T 19/20* (2013.01); *H04L 67/306* (2013.01)

(58) Field of Classification Search
None
See application file for complete search history.

(56) References Cited

U.S. PATENT DOCUMENTS

| 8,698,843 | B2 | 4/2014 | Tseng | |
|---|---|---|---|---|
| 2012/0050138 | A1* | 3/2012 | Sato | G02B 27/017 345/4 |
| 2012/0105476 | A1 | 5/2012 | Tseng | |
| 2012/0263372 | A1* | 10/2012 | Adachi | H04N 13/128 382/154 |
| 2013/0016878 | A1* | 1/2013 | Pan | G06K 9/4652 382/103 |
| 2014/0078175 | A1* | 3/2014 | Forutanpour | G06F 3/012 345/633 |
| 2017/0361216 | A1* | 12/2017 | Cao | A63F 13/213 |

OTHER PUBLICATIONS

Kaufmann, Hannes "Contruct3D; An Augmented Reality Application for Mathematics and Geometry Education" Institute of Software Technology and Interactive Systems, Tenth ACM International Conference, pp. 1-2, 2002.

Kaufmann et al., "Summary of Usability Evaluations of an Educational Augmented Reality Application" Virtual Reality, HCII 2007, LNCS 4563, pp. 660-669.

(Continued)

*Primary Examiner* — Martin Mushambo
(74) *Attorney, Agent, or Firm* — Hunton AK LLP

(57) ABSTRACT

A user can use a camera of a smart device to capture a video of the user's surroundings, and the smart device may superimpose a virtual object on the image being captured by the smart device. The virtual object can be selected based on actual objects in the surrounding environment of the smart device, e.g., a chalk drawing on the floor. The application may consider other factors in selecting the item, e.g., the user's profile and geolocation as well as features downloaded by user of the application, e.g., characters, accessories, masks, avatars, etc. The application can enable the user to interact with the virtual object by allowing the user to customize the object and add features to it.

20 Claims, 8 Drawing Sheets

(56) References Cited

OTHER PUBLICATIONS

Thomas et al., "First Person Indoor/Outdoor Augmented Reality Application; ARQuake" Personal and Ubiquitous Computing, vol. 6, pp. 75-86, 2002.

Thomas et al., "ARQuake: An Outdoor/Indoor Augmented Reality First Person Application" IEEE, Proceedings of the Firuth International Symposium on Wearable Computers, pp. 1-8, 2000.

Wagner et al., "Augmented Reality Kanji Learning" IEEE, Proceedings of the Second IEEE and ACM International Symposium on Mixed an Augmentd Realty, pp. 1-2, 2003.

Haller et al., "A Real-Time Shadow Approach for an Augmented Reality Application using shadow volumes" Proceedings of the ACM Symposium on Virtual Reality Software and Technology, pp. 56-65, Oct. 2003.

\* cited by examiner

SYSTEM AND METHOD FOR GENERATING AUGMENTED REALITY OBJECTS

BACKGROUND

Augmented reality is an enhanced version of reality where live direct or indirect views of physical real-world environments are augmented with superimposed computer-generated images over a user's view of the real-world. Sometimes, augmented reality includes computer-generated perceptual information across multiple sensory modalities, including visual, auditory, haptic, somatosensory, and olfactory. Augmented reality can enhance one's current perception of reality.

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models can involve training and fine tuning the model parameters using input data.

SUMMARY

Augmented reality provides unique learning and entertainment tools to children to interact with their surrounding environment, augment their sense of creatively and experiment with objects. Specifically, augmented reality can be used to superimpose virtual objects (or augmented reality objects) on a display of an image of an environment that is being captured (e.g., in real time). For example, a user of a smart device (e.g., a smartphone, a tablet, smart glasses, a wearable device, or the like) can use a camera of the smart device to capture a video of the user's surroundings, and the smart device (e.g., an augmented reality application running on the smart device) may superimpose a virtual object (e.g., an augmented reality object) on the image being captured by the smart device.

The virtual object can be selected based on actual objects in the surrounding environment of the child, e.g., a chalk drawing on the floor. The application may consider other factors in selecting the item, e.g., the user's profile and geolocation as well as features downloaded by user of the application, e.g., characters, accessories, masks, avatars, etc. The application can enable the child to interact with the virtual object by allowing the child to customize the object and add features to it. In one example embodiment, the user can record herself interacting with the virtual object and the application can post the interaction on a social media application. The augmented reality application can display features and functionalities for the virtual object that the child might not see or experience otherwise. As such, the virtual object can enhance the user's learning experience.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

This disclosure relates to a smart device application program which can record a photo or video feed by a camera of the smart device and display various virtual objects (e.g., animations) over the photo and/or video feed. Depending on the objects that appear in the photos and/or video prior to superposition of the virtual objects, the application can decide a selection of objects and functionalities for the objects to be displayed over the video feed. In one example embodiment, a user can snap a photo of a chalk drawing on the floor and display an animation selected based on the object depicted by the chalk drawing. The application enables the user to interact with the animation. The application can also enable the user to record the user's interactions with the application and post the interactions on a social media platform.

Figure 1:
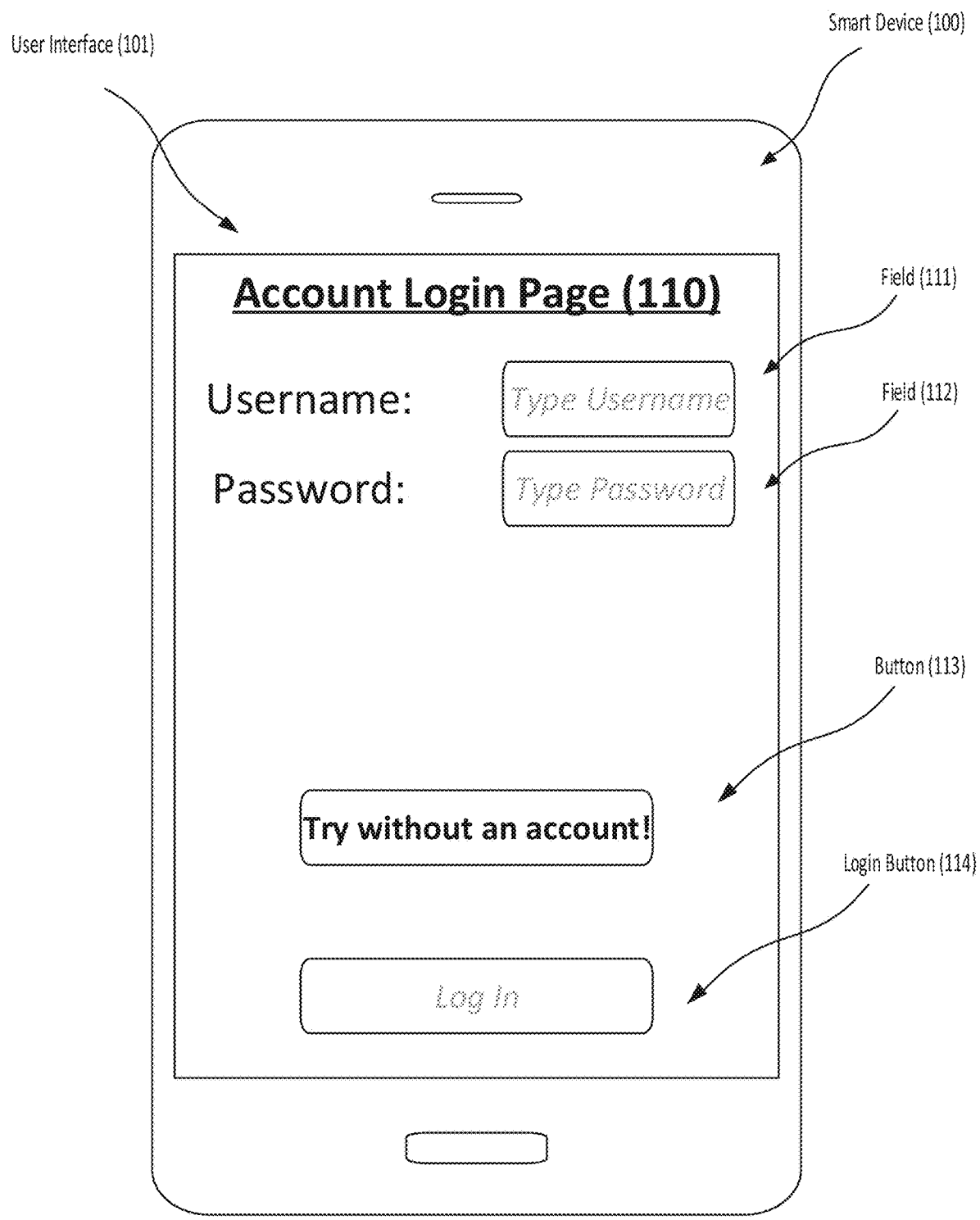
FIG. 1 shows an example account login page for an augmented reality application

FIG. 1 shows an example account login page 110 for an augmented reality application ("application"). The account login page 110 allows the user to access the application. The application can be configured to display a user interface 101 in the display of a smart device 100. The account login page 110 can include a field 111 for receiving a username, a field 112 for receiving a password and a login button 114 for logging in the account. The page 110 can also include a button 113 for accessing the augmented reality features of the application without entering any username or password.

In one example embodiment, accessing the application using a username and password can enable the application to access a profile for the user, and thereby display features and settings that were customized for the user. However, in another example embodiment, the user may access the application without a username or password.

Figure 2:
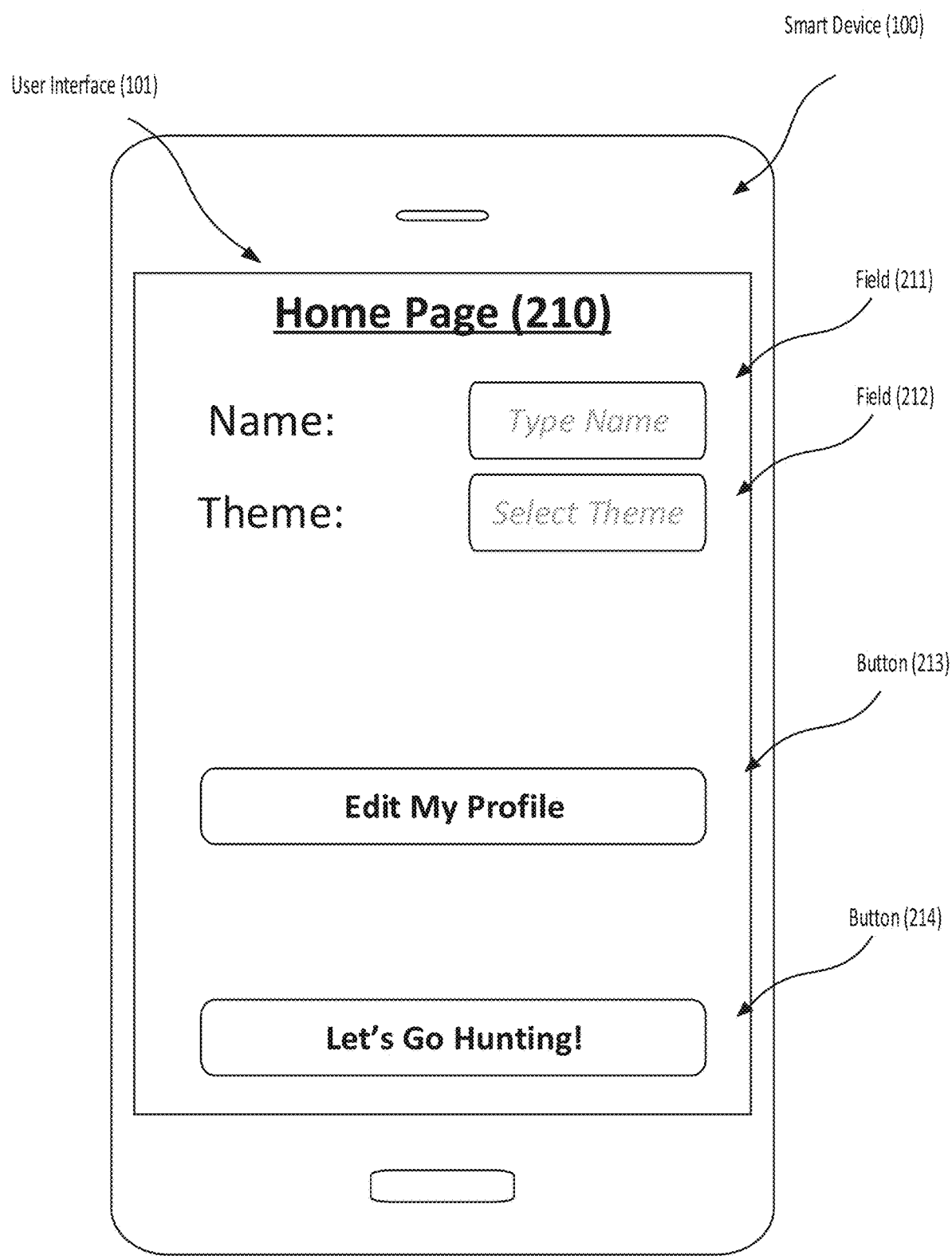
FIG. 2 shows an example home page for the application.

FIG. 2 shows an example home page 210 for the application. The home page 210 allows the user to access the augmented reality features of the application and navigate to a page which enables the user to edit the profile of the user. The home page 110 can include a field 211 for receiving the user's name, a field 212 for receiving a theme, a button 213 for editing the user's profile and a button 214 for activating the application's augmented reality features. By entering the user's name, the application can display and/or enunciate the user's name such that the user enjoys a more personalized experience when the virtual objects are displayed to the user. For example, an animation figure displayed in the user interface 101 can announce the user's name before speaking or taking commands from the user. The user can enter a theme in the field 212. By entering the theme, the user can specify the subset of virtual objects (and/or functionalities) that the user is interested in interacting with. For example, in one embodiment, the theme can be science or fun. In response to selecting science as the theme, the application can search for and display science related virtual objects, e.g., chemical compounds, and in response to selecting the fun theme, the application can search for and display cartoon characters. In one example, the searching function is triggered by scanning a photo at the camera of the smart device.

In one example embodiment, the application can store a set of themes, and for each theme, the application can define a set of objects and virtual reality responses. For example, for the fun theme, the application can store toys, and the virtual reality responses can include animations including the objects, and/or customized accessories added to the objects. The application can be configured to receive a photo or video and detect one or more objects in the photo or video. Based on the detected object, the application can trigger the virtual reality response. The virtual reality response can include displaying an animation, an accessory object, etc. In one example embodiment, the application can modify the animation and/or the accessory object based on a profile of the user, a geolocation data received from the user, a temperature or humidity of the environment in which the smart device is located, a speed, acceleration and/or GPS location detected by the smart device, a face or finger print detected by the smart device, a strength of cellular signal detected by the smart device, a background music, audible sound or inaudible sound detected by the smart device, etc. In one example, upon detection of a drawing of a rabbit, the application can trigger a virtual reality response, e.g., an animation displaying that the rabbit is walking. If the speed of the smart device is detected to be, e.g., faster than 20 miles/hour, the application can display the rabbit driving in a car. Similarly, if the detected humidity is above a threshold or data from a national weather station indicates that it is raining, the application can show raindrops in the animation. As another example, the application can encourage the user to obtain an umbrella if it is detected that the weather is rainy. For example, the application direct the user to an online app store to obtain an umbrella as an accessory.

In one example, upon detection of a barcode or an object (e.g., a shopping cart), the application can trigger a virtual reality response, e.g., the application can display an animation character running and/or walking in a store. In one example embodiment, a user can scan a barcode (or object or brand) in a store and the application can guide the user to a section of the store which displays a particular product. For example, upon detection of a barcode, the application can receive information about the store, e.g., name, address, merchant ID, etc. The application can transmit a signal to a central server, which stores information about the store. The signal can include information about the store and/or a particular product or manufacturer. The central server can store information such as an indoor map for the store, a database of where each product is located, etc. The central server can transmit this information to the smart phone, e.g., the indoor map, and/or an indoor location for a product or products of the manufacturer. The application can devise a navigation strategy and guide the user to a section which includes the products. For example, the application can display an animation character walking toward the section of the store. The application can also display one or more products to the user to purchase, e.g., the application can recommend one or more products based on the user's profile once the user arrives at the section including the manufacturer's products. In one example, the application can use triangulation techniques to determine the location of the smart device inside the store.

In one example, the application can recommend products or discounts based on an inaudible sound detected at the store. The application can receive the inaudible sound and detect a message in the sound. Based on the message, the application can recommend the products. Alternatively, the application can transmit the message (and/or the user's profile) to the central server, and the application can determine the product based on a response from the central server. The central server can look up one or more products based on the message (e.g., 10% discount) or the user's profile (e.g., 5-year old girl) and identify a product to recommend to the user.

In one example embodiment, the user can be associated with a profile. The application can use the information included in the user's profile to select virtual objects (and/or functionalities or virtual reality responses) that match the user's expected preferences. For example, for a younger user, e.g., 3, the application can recommend simple science experiments, but for an older user, e.g., 10, the application can recommend elaborate science experiments. As another example, based on the user's profile (and/or geolocation), the application can choose the language and accent by which the animation figures communicate with the user. In one example, the profile can include biographical, biometric and/or financial information, e.g., name, gender, age, weight, height, language spoken, address, credit card information, etc. As another example, the profile can include information about the user's interactions with the application, e.g., user's prior selections, photos snapped, searches commanded, purchases, etc. In one example embodiment, by pressing the button 213, the user can edit or update the information included in the user's profile. The user's profile can be stored locally on the smart device 100 or it can be stored in a server. In one example embodiment, the user's profile can be accessible (and the application can customize the user's experience based on the profile) only after the user logs in. In another example, the application can retain or retrieve a user profile without requiring the user to log in.

In one example embodiment, the application can use a machine learning model to predict the types of characters, virtual reality objects, virtual reality responses and virtual reality accessories that can be of interest to the user. For example, a central server can receive data from a plurality of applications or smart devices. The data can include user profile information and user interaction information with each application. Based on this information, the central server can train a classification model which can predict the characters, virtual reality objects, virtual reality responses and virtual reality accessories that can be of interest to the user. The central server can transmit the classification model to the smart phone and the application can use the classification model in recommending characters, virtual reality objects, virtual reality responses and virtual reality accessories to the user.

Figure 3:
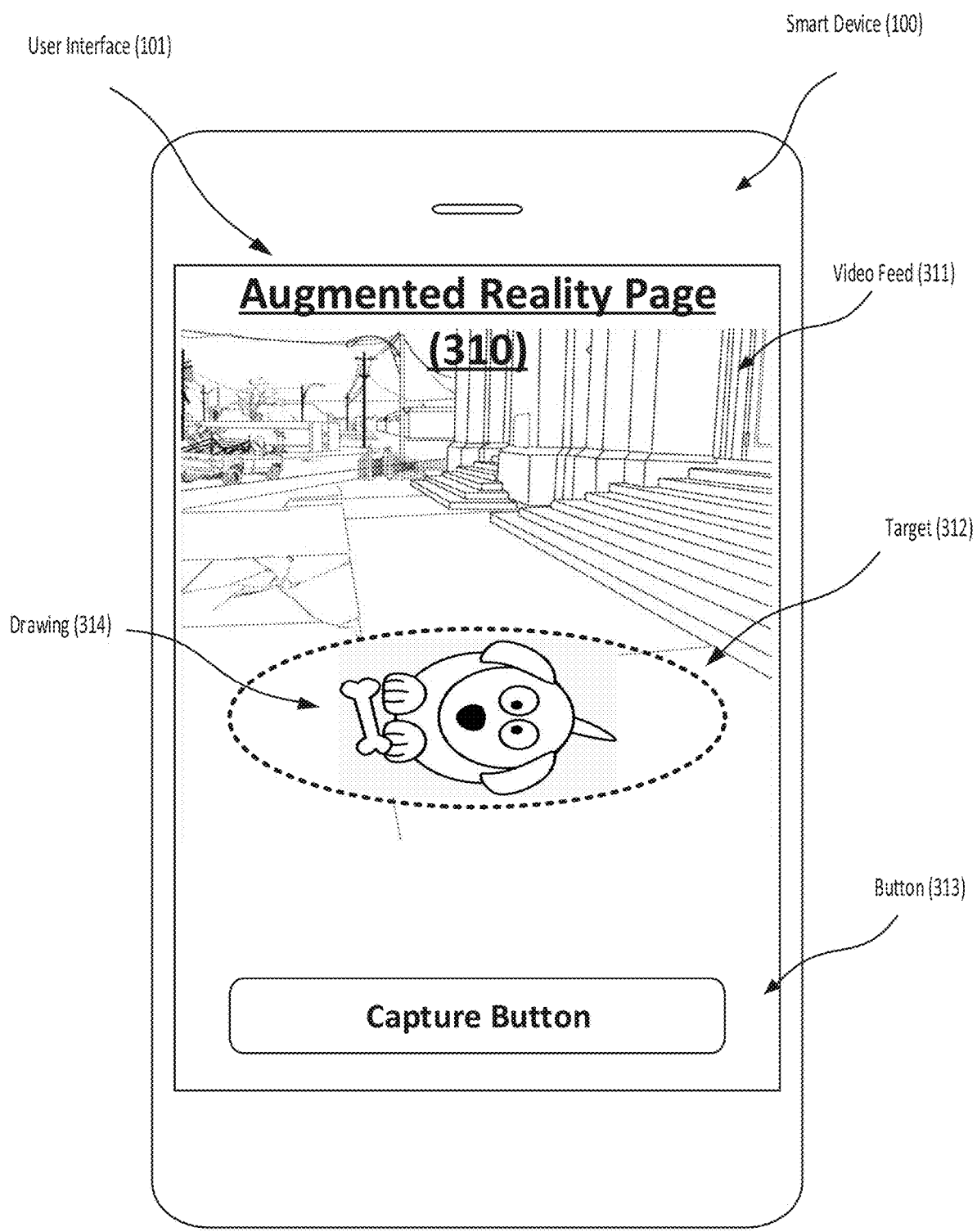
FIG. 3 shows an example augmented reality page of the application.

In one example embodiment, by pressing the button 214, the application can activate the augmented reality features. FIG. 3 shows an example augmented reality page 310 of the application. When a user visits this page, the camera of the smart device 100 can be activated and on the augment reality page 310, the user interface can display a video feed 311 or a set of images received from the smart device's camera. The user interface can display the video feed 311 or the set of images as the camera receives them. In one example embodiment, the application can detect a drawing 314 or an object in the video feed and the user interface can superimpose a virtual object (e.g., drawing, shape or animation) on the video feed or the set of images. In one example embodiment, the page can also enable the user to take a photo. For example, while displaying the video feed or the set of images, the page can include a button 313 for taking a video segment or photo. Once the application takes the video segment or photo, the application can identify the drawing 314 or an object in the photo and based on the identification of the drawing or the object, the application can display the virtual object.

In one example embodiment, the augmented reality page 310 can include a target 312. The target 312 can be a pointer displayed on the augmented reality page 310 to guide the user to point the phone at a specific location on the ground or in the space, thereby making the task of detecting an object or drawing 314 easier. For example, the target 312 can have a circular shape, and the application can suggest that the user point the phone to a drawing such that the object or drawing 314 falls within the target 312. By requiring the user to point the phone at the drawing in this manner, the task of object detection can be simplified for the application.

In one example embodiment, if the user captures a photo but there is no drawing in the target 312, or there is only a partial drawing in the target 312, the application can display an error (e.g., no objects detected; only a partial object is detected). In this example, once the user captures the photo, the application can try to detect an object. If no object is detected, or an object is detected but the confidence rate of the detection is less than a threshold, the application can display an error signal.

In an example embodiment, the application can detect a ground plane in the video feed (e.g., streaming image data) displayed on the user interface of the smart device. This detection can allow the application to place augmented reality objects on the ground plane. There can be various techniques for detecting the ground plane. In one technique, the application can detect a few points on a plane in the video, and if those points have the same features, that plane can be recognized as the ground plane. Specifically, using feature extraction through visual processing, the application can extract certain features in the images and use the extracted features to establish certain points which are coplanar. If the application establishes that the extracted points are coplanar, then the application can establish that the plane on which these points are located is the ground plane. The grouping of the feature points and the orientation of the phone can assist in determining the ground plane. Some of the smart device's sensors can also be utilized in this process. For example, an accelerometer and a gyroscope can provide data to the application to facilitate the ground plane detection. In one example embodiment, the application can display the virtual reality object and virtual reality responses on the visual representation of the ground plane.

In another technique, the application can identify a horizontal plane in an image being captured by the smart device. The application can further determine a size of the horizontal plane, and may determine that the size of the horizontal plane satisfies a threshold value. Based on the size of the horizontal plane, the smart device can designate the horizontal plane as a ground plane and can superimpose a representation of an augmented reality object on the image relative to the horizontal plane designated as the ground plane.

In some embodiments, the user may have to establish the ground plane before pointing the smart device at an object. Specifically, in these embodiments, the user may point the smart device at the ground before pointing the smart device at the object. If the user does not point the smart device at the ground first, the user interface can display a message which asks the user to establish the ground plane.

Additional ground plane detection techniques are described in the U.S. patent application Ser. No. 15/850,234 (now U.S. Pat. No. 10,026,209), which is hereby incorporated by reference.

In an example embodiment, the application can determine a distance between the smart device (e.g. a smart phone) and a point on the ground plane. Various techniques can be used for determining the distance. For example, when a user points the phone to the ground, the application can determine a point on the ground where a hypothetical perpendicular line or plane coming out of the phone would hit the ground or intersect with the ground plane. This perpendicular line or plane may correspond to a center-point (or center-points) of the field of view of the camera or a center-point of image data. This point (e.g., where the ground plane intersects with the hypothetical ground plane) can be called the intersection point. The application can determine the coordinates of the intersection point as well as the smart device, and thus, the application can determine the distance between the two points. While the intersection point is defined as described above, one of ordinary skill in the art recognizes that there are many different ways to define an intersection point. For example, the stated hypothetical line, does not have to be perpendicular to the phone. In one example, the intersection point can refer to a location in the surrounding environment of the smart phone which corresponds to the center point of the target 312.

In an example embodiment, after determining the ground plane, the user can point the phone to an object or drawing. The application can determine a distance between the smart device and an intersection point on the object or drawing. In one example, the application can identify the object and/or drawing and display a virtual object on the display based on the detected object.

In one example embodiment, the application can use a distance between a smart device and an intersection point (or the object or drawing) to determine a size for the virtual reality object and/or response. For example, if the intersection point is close, e.g., within 5 feet, the application can display the virtual reality object and/or response in a large size, but if the distance greater than 5 feet, the application can display the virtual reality object in a small size.

In this disclosure, various embodiments have been described in which the application (or user) takes a photo of an object or the application receives image data, video feed or video stream. One of ordinary skill in the art recognizes that a photo can be image data and that video feed or stream can also include image data. Moreover, a video feed or stream can include a plurality of photos (or photo frames). Additionally, a photo or image data can include a single still image capture or a captured frame of streaming image data (video feed or video stream).

The Machine Learning Model and Object Recognition

In an example embodiment, after the user snaps a photo or otherwise captures an image, the application can feed the image data of the photo into the machine learning or predictive model. In one embodiment, the application can crop parts of the photo before feeding the photo into the model. For example, the application can crop out the center portion of the image to include only the middle third of the image. As another example, the application can exclude the pixels that fall outside of the target.

In an example embodiment, the machine learning model can be designed to identify drawings and/or objects. In this example embodiment, the model can be trained using many photos of objects. For example, the machine learning model can be trained to identify drawings or objects appearing in a household. Once a photo is provided to the model, the model can return one or more identification names and a probability value associated with that identification for each name. For example, the model can determine that the drawing displays a cartoon character named Armin with a likelihood of 80%. The application can further display the name of the detected drawing if the probability is above a threshold value. As another example, the model can determine that the object is a toy gun with a likelihood of 68%. In this example, the application won't display the name of the detected object because the probability is below the threshold value.

In one example, if the model is unable to identify the object or it identifies an object with too low of a probability, the user will be presented with an error. In another example, if the model is unable to identify the object or it identifies an object with too low of a probability, the application can present the user with a predetermined virtual object, e.g., animation. In one example, the machine learning model of this disclosure can be stored on the smart device. However, in some embodiments, the model can be stored on another device, and the smart device can transmit the photos or videos to the other device for identification. The smart device is configured to receive the identification from the other device.

In an example embodiment, prior to feeding the image data of the photo (or video) into the machine learning model, the application can indicate whether the image quality is unsatisfactory. For example, if there is too much light or glare in the video or streaming images that the camera is capturing, the application can indicate to the user that the user needs to move or point the camera in a different direction. As another example, if the camera is too close to the object such that the object does not fit into the target or display of the smart device, the application can display a notification.

Figure 4:
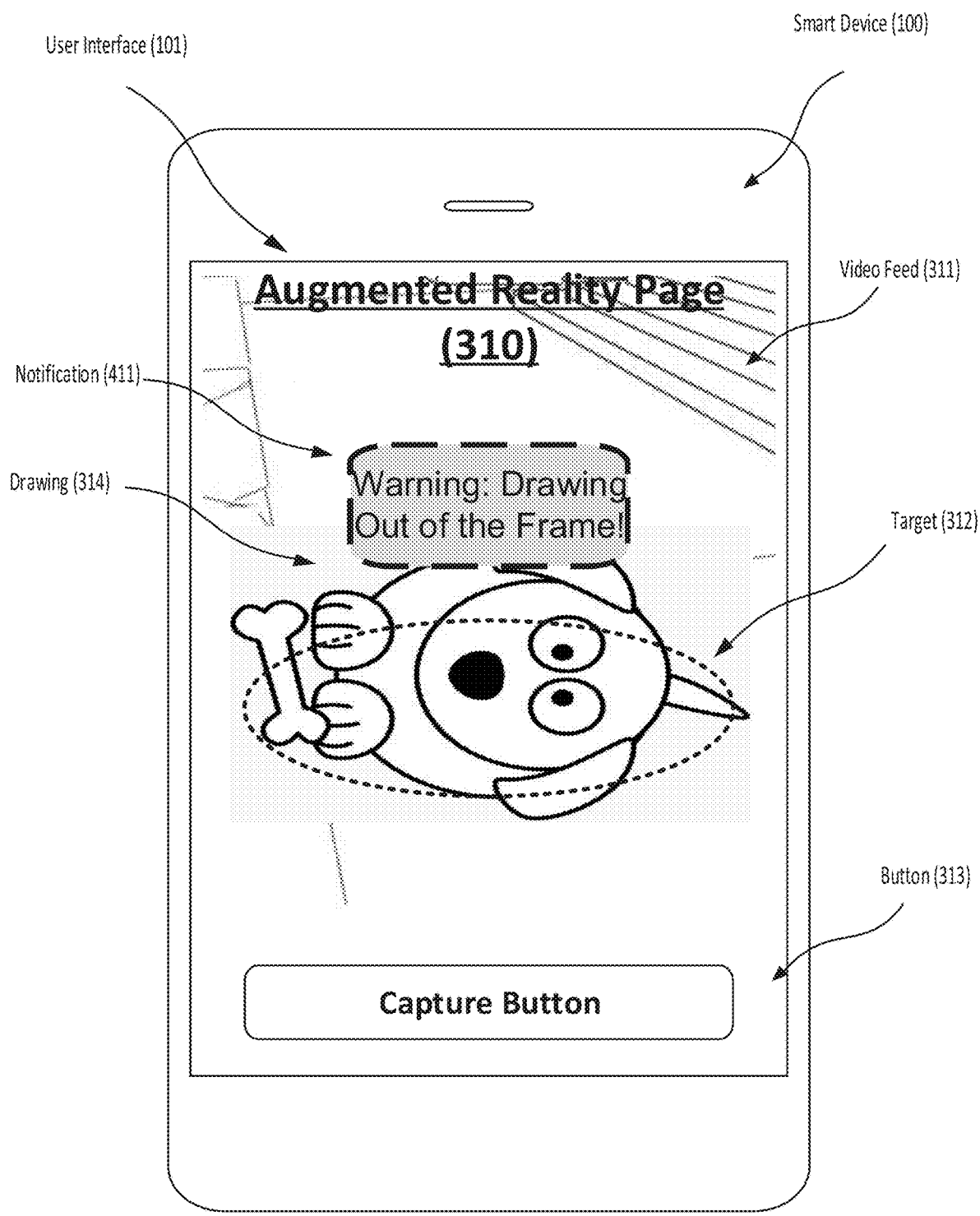
FIG. 4 shows the augmented reality page of the application displaying a notification according to an example embodiment.

FIG. 4 shows the augmented reality page 310 of the application displaying a notification according to an example embodiment. In this example embodiment, first the user points the smart device 100 to a drawing on the ground. The application establishes the ground plane and detects the coordinates of the intersection point on the ground. The application also determines a distance between the smart device and the intersection point. The application detects a drawing or an object within the target 312. The application can determine that only part of the drawing 314 is displayed in the target 312. Hence, the application can display a notification 411 including a warning message in the user interface 101. In one example, once the user moves the smart device such that the entirety of the drawing is displayed within the target, the application can then perform an object recognition routine.

In an example embodiment, the application can perform an object recognition function. If the application detects that the whole object is not displayed in the user interface (or the target) or that the object is oriented in a direction which is not optimal for identification, the application can notify the user to switch the angle. For example, an application can be implemented to capture images of children's toys and identify at least the make and model of the toy. Prior to feeding an image of the toy, the application can determine whether the toy is in the frame. If the application does not detect a toy in the frame, the application can display an error message to the user. If the application detects a toy in the frame, the application can determine which side of the toy is in the frame. In some embodiments, the model may most accurately and efficiently identify a captured toy based on image data of a front cover of the toy box. If the application determines that the user is pointing the smart device from the side of the toy box, the application can notify the user to move the smart device around the toy box so that a better shot of the toy box can be captured. Once a user moves around to a desired side of the toy box, e.g., front cover, the application can proceed to the next step.

Selection of the Virtual Object

In an example embodiment, after determining the identity of the drawing or object, the application can conduct a search to determine an action to execute in response to the identified drawing or object (e.g., virtual reality response). The application can search the memory of the smart device and retrieve an animation tagged with a word that matches the identified drawing or object. For example, in response to identifying a dog in a drawing, the application can retrieve an animation displaying a dog nodding her head up and down. The animation can be superimposed on the video feed. As another example, the application can submit a search query to a server and receive from the server an animation tagged with a word that matches the identified drawing or object. The application can display this animation to the user.

In one example, in addition to an identification of an object, the application can take into account other factors when selecting a virtual reality object and/or animation. For example, the application can receive data points such as speed, acceleration, facial identification, fingerprint identification, geolocation information, time, weather information, and profile information when searching for the virtual reality object and/or animation. In one example, the application is configured to display or retrieve from a central server only the animations that match these factors, e.g., speed and humidity that exceed a threshold. In this example, if the speed and humidity exceed the threshold, the application can, e.g., display a dog that is riding in a car when it is raining. In another example, the application is configured to modify a virtual reality object and/or animation to match the factors. For example, the application can store an animation for a dog that is moving. But if the speed exceeds a threshold, the application can display the dog as riding in a car.

Figure 5:
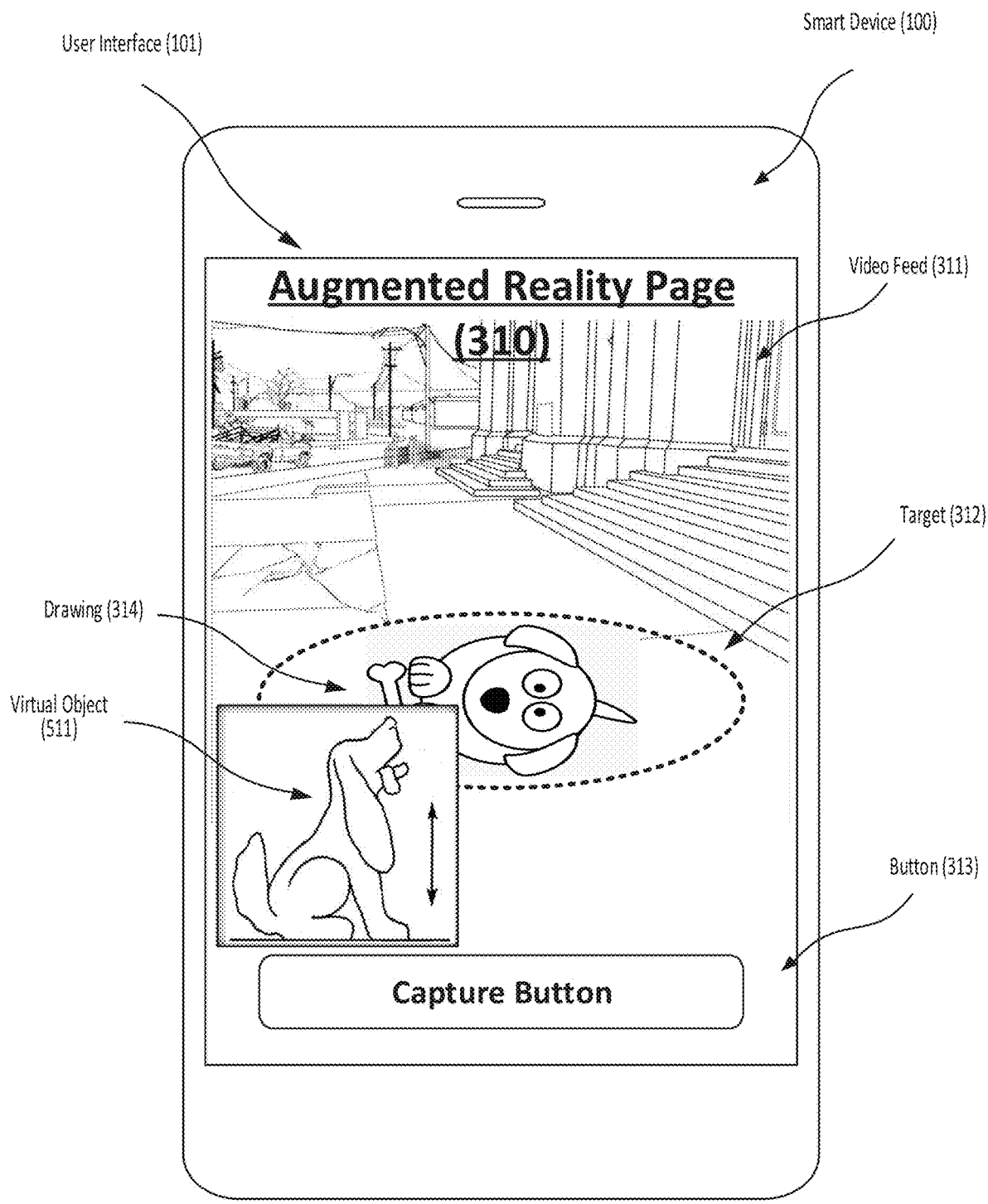
FIG. 5 shows the augmented reality page of the application displaying a virtual object according to an example embodiment.

FIG. 5 shows the augmented reality page 310 of the application displaying a virtual object according to an example embodiment. In this example embodiment, the user can point the smart device 100 to the drawing 314. Subsequently, the user can press the capture button 313, and in response, the application can record a video segment. The machine learning model of application can analyze the captured video segment and determine that a dog is displayed in the target 312. In response, the application can retrieve a virtual object 511 depicting an animated dog nodding her head. The application can superimpose the virtual object over the video feed 311.

In one example embodiment, the application of the smart device can determine the virtual object based on the drawing scanned at the augmented reality page 310 (and/or the user's profile or the theme defined by the user). In another example embodiment, a server in communication with the smart device can determine the virtual object. For example, the application can transmit a signal to the server, and in response, the server can transmit to the smart device the virtual object. In yet another example embodiment, the smart device and the server can jointly determine the virtual object. For example, the application can transmit to the server a video snippet of the video stream. Based on the video stream, the server can determine a theme for the virtual object. The server can transmit the theme to the smart device and based on the theme (and/or the user's profile) the smart device can determine the virtual object. In one example embodiment, the application can automatically determine the theme based on a data point detected at the smart device, e.g., speed or humidity. In yet another example, the application can determine the theme based on data received from a central server, e.g., weather forecast.

In an example embodiment, the application of the smart device or the server can include an object recognition module. For example, the module can receive a video feed from the camera of the smart device and determine one or more objects in the video feed. Based on the identity of the object displayed in the target as well as other objects detected in the video feed, the application of the smart device or the server can determine the virtual object. For example, the object recognition module can detect a dog in the target 312. The object recognition module can also identify several indoor objects, such as a door, carpet, table and chair, in the user's environment. The application or server can determine to display augmented reality objects related to the dog and these indoor objects, e.g., an indoor dog toy. As another example, the object recognition module can detect a tree, and the application of the smart device or server can determine to display an outdoor toy for a dog.

In one example embodiment, the application of the smart device or the server can include a scene recognition module. For example, the module can receive a video feed from the camera of the smart device. In one embodiment, the camera provides the video feed to the module in the background such that the user does not notice this provisioning of the video feed to the module. The module can analyze this video and determine a scene provided in this video feed. For example, in one embodiment, the module can determine that the scene depicts a beach. The module can provide this information to the application of the smart device, and the application can determine to display augmented reality objects related to a beach, e.g., a boat and a flag. As another example, the module can determine that the scene is an indoor shopping area. In response to this determination by the module, the application can display a shopping cart as an augmented reality object.

In one example embodiment, the application of the smart device can include a module for determining the location of the smart device and the application or the server can determine the virtual object based on the location of the smart device (and/or other criteria). For example, the application can determine the location of the smart device based on a GPS signal received at the smart device. As another example, the application can determine the location of the smart device based on a Wi-Fi signal received at an indoor location. As yet another example, the application can determine the location of the smart device based on an inaudible signal detected at the smart device. Using the location information, the application or the server can determine the virtual object. For example, if the application determines that the user is in a restaurant, the application can choose to display augmented reality objects relating to a restaurant, e.g., various types of food.

In one example embodiment, in determining the virtual object, in addition to using location-based data (and/or other criteria), the application can use sensory information provided by the smart device. For example, the smart device can utilize a compass, a gyroscope, and an accelerometer to provide data for determining the components of the human challenge. This data then determines what augmented reality objects are displayed to the user, e.g., depending on which side of the street the user is facing.

Functionalities of the Virtual Object

In one example embodiment, the user can interact with the virtual object. There can be various techniques for a user to interact with a virtual object. For example, the user can tap or click on the virtual object. As another example, the user can draw a circle around the virtual object. As yet another example, the user can draw a connection between the virtual object and another object. For example, the user can connect the virtual object to another object by moving the user's finger from the first virtual object to another virtual object.

Figure 6:
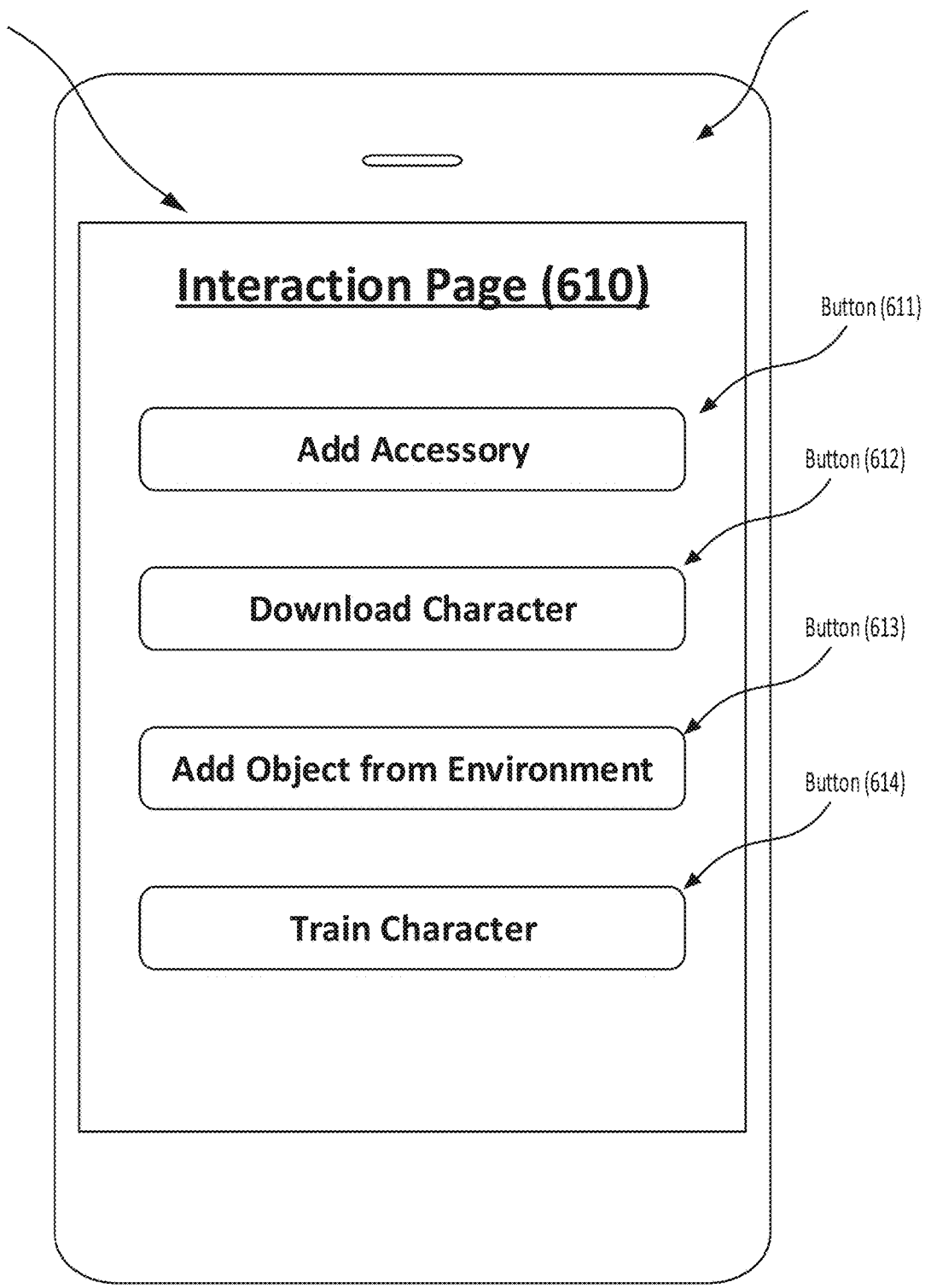
FIG. 6 shows an example interaction page for specifying a type of interaction with a virtual object.
Figure 7:
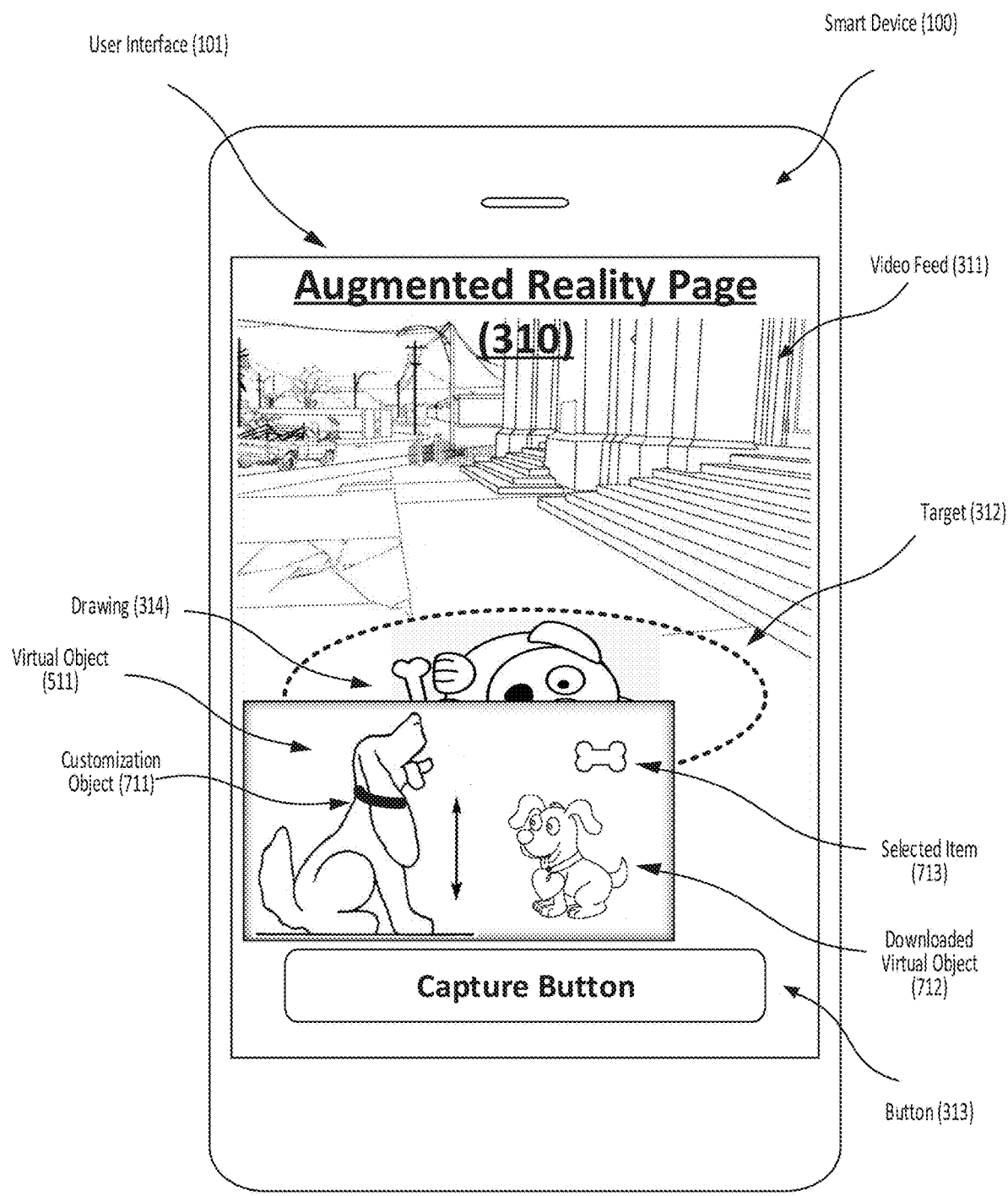
FIG. 7 shows implementations of example interactions requested in the interaction page.

In response to receiving a command, e.g., as described above, the application can display a page for selecting a type of interaction with the virtual object. FIG. 6 shows an example interaction page 610 for specifying a type of interaction with a virtual object. FIG. 7 shows implementations of example interactions requested in the interaction page 610. In this example embodiment, the interaction page 610 can include a button 611 for adding an accessory to the virtual object, a button 612 for downloading a character, a button 613 for adding an object from the environment, and a button 614 for training the virtual character.

In response to pressing the button 611 for adding an accessory to the virtual object, the user can be prompted with one or more options for customizing the virtual object. For example, by pressing the button 611, the application can prompt the user to select a color for the virtual object 511 (e.g., gray) or add an item or article of clothing to the virtual object (e.g., dog collar). FIG. 7 shows a customization object 711 added to the virtual object 711. In this example, the virtual object 711 is a dog collar. In one example embodiment, the application can provide a library which stores these virtual objects. The user can gather these objects by downloading them from a central server or by creating them in the user interface of the smart device, e.g., making a drawing. When trying to customize a virtual object, the user can select one of the customization objects stored in the library and add it to the virtual object.

In response to pressing the button 612 for downloading a character, the user can be prompted to select one or more virtual objects to download from an application store. Each downloaded virtual object can be associated with one or more tags, which can facilitate selection of the downloaded virtual object in response to a matching item in a photo or video. For example, by pressing the button 612, the application can display the application store and select a puppy character for downloading. Once downloaded, the application can display the downloaded virtual object in association with the virtual object 511 or whenever responsive to a scanned photo or video. FIG. 7 shows a downloaded virtual object 712 added to the augmented reality 310. In this example, the downloaded virtual object 712 is a puppy. In one example embodiment, a predetermined set of reactions and results can be defined for the virtual object and/or the downloaded virtual object such that when the downloaded virtual object is added next to or in the same page as the virtual object, the virtual object and/or the downloaded virtual object produce the predetermined set of reactions and results. For example, in this case, when the puppy 712 is added to the augmented reality page 310, both the dog 511 and the puppy 712 can start barking. In one example, the downloaded virtual object can be stored in the library and accessed therefrom.

In response to pressing the button 613 for adding an object from the environment, the user can be prompted with a live feed of the camera. In this mode, the user can select an item and the application can add a photo of the item (or a drawing associated with the item as determined by a machine learning model) to the profile (or library) of the user. For example, by pressing the button 613, the application can prompt the user to select an object within the video feed. In one example embodiment, the user can select a bone (e.g., by drawing a circle around the object or by clicking on the object). Subsequently, the application can add the bone to the user's profile (or library) and display the bone in association with the virtual object. FIG. 7 shows a selected item 713 in association with the virtual object 711. In this example, the selected item 713 is a bone. In one example embodiment, a predetermined set of reactions and results can be defined for the virtual object and/or the selected item such that when the selected item is added next to or in the same page as the virtual object, the virtual object and/or the selected item produce the predetermined set of reactions and results. For example, in this case, when the bone 713 is added to the augmented reality page 310, the dog 511 can grab the bone 713.

In response to pressing the button 614 for training the virtual character, a virtual character can be trained to perform a specific function in response to a trigger event. For example, during a training mode, a user can select an object from the library and move the virtual object and the selected object in a particular pattern. The application can learn this pattern of movement and replicate the movement once the virtual object and the selected object are displayed together. In one example, the virtual object can be a unicorn and the selected object can be a rainbow. During a training mode, the user can move the unicorn toward the rainbow. As such, once the unicorn and rainbow are displayed together, the unicorn can move toward the rainbow. In one example, a dinosaur can be trained to hop over objects. In another example, a dolphin can be trained to balance a ball. In yet another example, an alien can be trained to make funny facial expressions, e.g., during training the user can move its facial components in a funny manner.

In one example embodiment, the user can collect and add to the library a series of characters which can interact with one another. Each character can have a predefined set of strengths and weaknesses and the user can activate the characters to compete with each other. For example, the user can add a series of robots to the user's library. Each robot can have a building power. If two or more of the robots are activated in the user interface, the application can display the activated robots. The application can also show the robots participate in a building competition in which the robot with the highest building power can win. In one example, the user can collect a series of princesses. In this example, these princesses can participate in a beauty pageant and the princess with the highest beauty score can win.

In one example embodiment, the application can include a feature detection module. For example, the user can upload a pre-edit photo and a post-edit photo. The application can determine the features that were added to the photo and add similar features to a virtual reality object. For example, a user can upload a photo of the user prior to applying makeup and a photo of the user after applying the makeup. The application can ascertain one or more makeup feature changes, e.g., addition of lipstick, and the application can add the same makeup feature to a virtual reality character. In one example, the user can add makeup to a drawing. The application can determine the added makeup and provide a similar makeup to a virtual reality object.

In one example, the application can allow the user to customize a virtual representation of a real object. For example, a user can scan a friendship bracelet that has alphabet beads added to spell out a person's name. The application can recognize this object and recognize parts of the object that can be modified or customized. Upon instruction of the user, the application can customize the friendship bracelet. For example, the application can change the color of the beads and add glitter.

Social Media Aspects

In one example embodiment, the application can display a virtual object performing a task and the application can prompt the user to perform the same task. The application can record the user performing the task and superimpose the virtual object on the user's recording. For example, the application can display a cartoon character dancing and the application can prompt the user to emulate the same dance. The application can record the user making the dance and can display the virtual character next to the user making the dance moves.

In one example embodiment, the application can record the user making a dance. Using an object orientation technique, the application can determine the user's moves. The application can display a virtual character making the same dance moves next to the user.

In one example embodiment, the application can post a user's recording onto a social media platform. For example, the application can include a page configured to receive the user's social media credentials. Upon creating a video, the application can prompt the user whether the user is interested in posting the video on the social media platform. If the user responds affirmatively, the application can post the video on the social media platform. In one example, the user can post information derived from the user's profile onto the social media platform. For example, the user can post a list of items collected by the user on the social media account.

3-D Space Construction

In an example embodiment, the application can detect a ground plane (or a horizontal plane) in the video stream displayed on the user interface of the smart device. This detection can allow the application to place augmented reality objects on the ground plane (or the horizontal plane), e.g., a dog on the floor and a cat on the bed.

In one example embodiment, the application can construct a 3-D model of the space in front of the user. For example, the user can initially scan the space and the application can construct a 3-D model of the scanned space. The application can include a database of attributes for augmented reality objects. Based on the 3-D model and information provided in the memory (or sever database), the application can place the augmented reality objects in logical places for these augmented reality objects. For example, the 3-D model can include information about the horizontal and vertical surfaces. The application can place the augmented reality objects that usually rest on horizontal surfaces on a horizontal surface and the augmented reality objects that usually rest on vertical surfaces on a vertical surface. In one example, the application can determine that the user is in an indoor space, and thus, the application can decide to display indoor items to the user. The application can decide to show a frame on a wall of the indoor space (i.e., vertical surface) and the application can decide to display a dog on a bed (i.e., horizontal surface).

Technical Implementation of the Server

Figure 8:
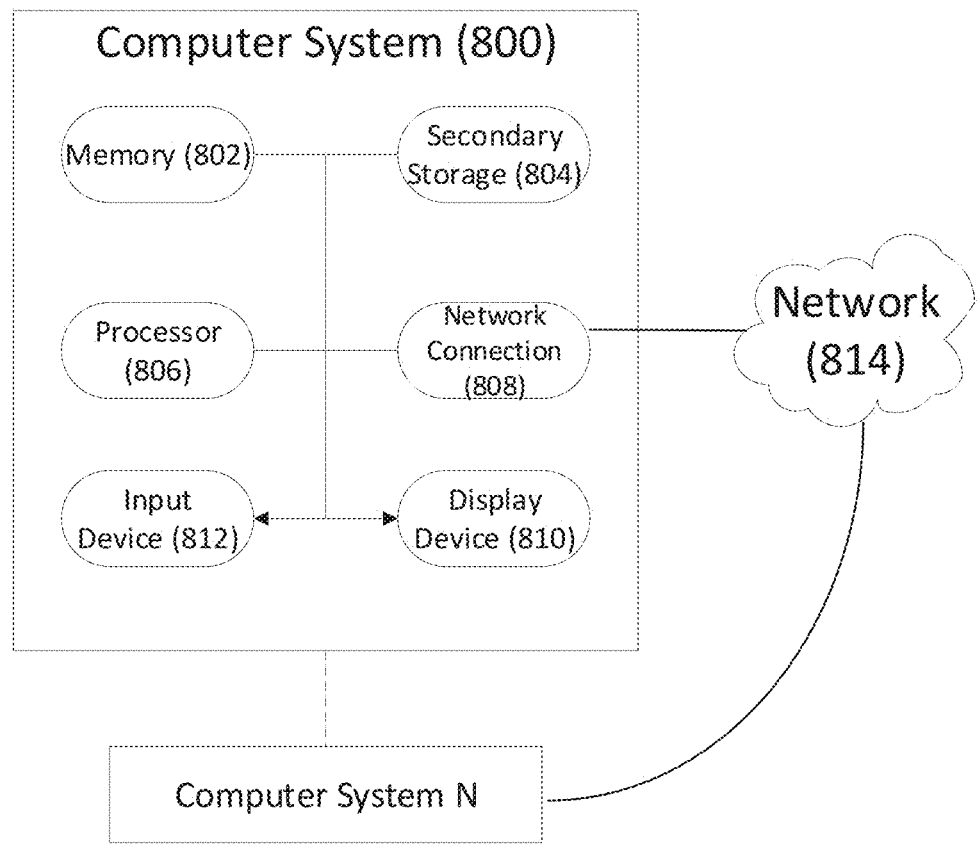
FIG. 8 illustrates exemplary hardware components for a server or a smart device.

FIG. 8 illustrates exemplary hardware components of a server. A computer system 800, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 800, may run an application (or software) and perform the steps and functionalities described above. Computer system 800 may connect to a network 814, e.g., Internet, or other network, to receive inquiries, obtain data, and transmit information and incentives as described above.

The computer system 800 typically includes a memory 802, a secondary storage device 804, and a processor 806. The computer system 800 may also include a plurality of processors 806 and be configured as a plurality of, e.g., bladed servers, or other known server configurations. The computer system 800 may also include a network connection device 808, a display device 810, and an input device 812.

The memory 802 may include RAM or similar types of memory, and it may store one or more applications for execution by processor 806. Secondary storage device 804 may include a hard disk drive, floppy disk drive, CD-ROM drive, or other types of non-volatile data storage. Processor 806 executes the application(s), such as those described herein, which are stored in memory 802 or secondary storage 804, or received from the Internet or other network 814. The processing by processor 806 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 800 may store one or more database structures in the secondary storage 804, for example, for storing and maintaining the information necessary to perform the above-described functions. Alternatively, such information may be in storage devices separate from these components.

Also, as noted, processor 806 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 800.

The input device 812 may include any device for entering information into the computer system 800, such as a touch-screen, keyboard, mouse, cursor-control device, microphone, digital camera, video recorder or camcorder. The input and output device 812 may be used to enter information into GUIs during performance of the methods described above. The display device 810 may include any type of device for presenting visual information such as, for example, a computer monitor or flat-screen display (or mobile device screen). The display device 810 may display the GUIs and/or output from sub-system components (or software).

Examples of the computer system 800 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 800 is shown in detail, system 800 may use multiple computer systems or servers as necessary or desired to support the users and may also use back-up or redundant servers to prevent network downtime in the event of a failure of a particular server. In addition, although computer system 800 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 800, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A client device comprising:
a processing circuitry;
a memory;
a camera
a display; and
a sensor;

wherein the processing circuitry is configured to:
  receive a video feed from the camera;
  display a target over an area in a visual representation of the video feed;
  identify a drawing in the target;
  detect a location of the client device and a data point received from the sensor;
  select a virtual reality object based on:
    an identity of the drawing;
    a preference specified in a profile; and
    a geolocation of the client device;
  display the virtual reality object in the display;
  display a function for the virtual reality object, wherein the function is selected based on the data point; and
  recording a media file in response to displaying the function.

2. The client device of claim 1, wherein the processing circuitry is further configured to post the media file to a social media account.

3. The client device of claim 2, wherein the media file is a video or a photo.

4. The client device of claim 1, wherein the processing circuitry is further configured to display a prompt requesting input for posting the media file to a social media account.

5. The client device of claim 1, wherein the processing circuitry is further configured to, in response to receiving an input, add a feature to the virtual reality object.

6. The client device of claim 5, wherein the processing circuitry is further configured to detect the feature in the media file.

7. The client device of claim 1, wherein the preference is a theme.

8. The client device of claim 7, wherein the theme is associated with a set of predetermined virtual reality objects.

9. The client device of claim 1, wherein the processing circuitry is further configured to receive a username and a password to provide access to the profile.

10. The client device of claim 9, wherein the processing circuitry is further configured to receive information to be added to the profile.

11. The client device of claim 1, wherein the processing circuitry is further configured to detect a scene in the video feed.

12. The client device of claim 11, wherein the processing circuitry is further configured to select the virtual reality object based on the scene.

13. The client device of claim 1, wherein the processing circuitry is further configured to superimpose a visual representation of the function for the virtual reality object over the media file.

14. The client device of claim 1, wherein the processing circuitry is further configured to display an object selected from a library.

15. The client device of claim 14, wherein the processing circuitry is further configured to receive movement input indicating movement of the object when the virtual reality object is displayed.

16. The client device of claim 15, wherein the processing circuitry is further configured to replicate the movement input if the same object and virtual reality object are selected.

17. The client device of claim 1, wherein the data point is a speed data point or an acceleration data point.

18. The client device of claim 1, wherein the data point is a facial image or a fingerprint.

19. The client device of claim 1, wherein the data point is a background music, an audible sound or an inaudible sound.

20. The client device of claim 1, wherein the geolocation is a GPS location.

* * * * *